J. T. SHILLITO.
CAKE CUTTING MACHINE.
APPLICATION FILED AUG. 12, 1919.

1,342,875.

Patented June 8, 1920.
3 SHEETS—SHEET 1.

Inventor:
JAMES T. SHILLITO,
By Bakewell Church
His Attorneys.

J. T. SHILLITO.
CAKE CUTTING MACHINE.
APPLICATION FILED AUG. 12, 1919.

1,342,875.

Patented June 8, 1920.
3 SHEETS—SHEET 2.

Inventor:
James T. Shillito,
By Bakewell Church
His Attorneys

J. T. SHILLITO.
CAKE CUTTING MACHINE.
APPLICATION FILED AUG. 12, 1919.
1,342,875.
Patented June 8, 1920.
3 SHEETS—SHEET 3.
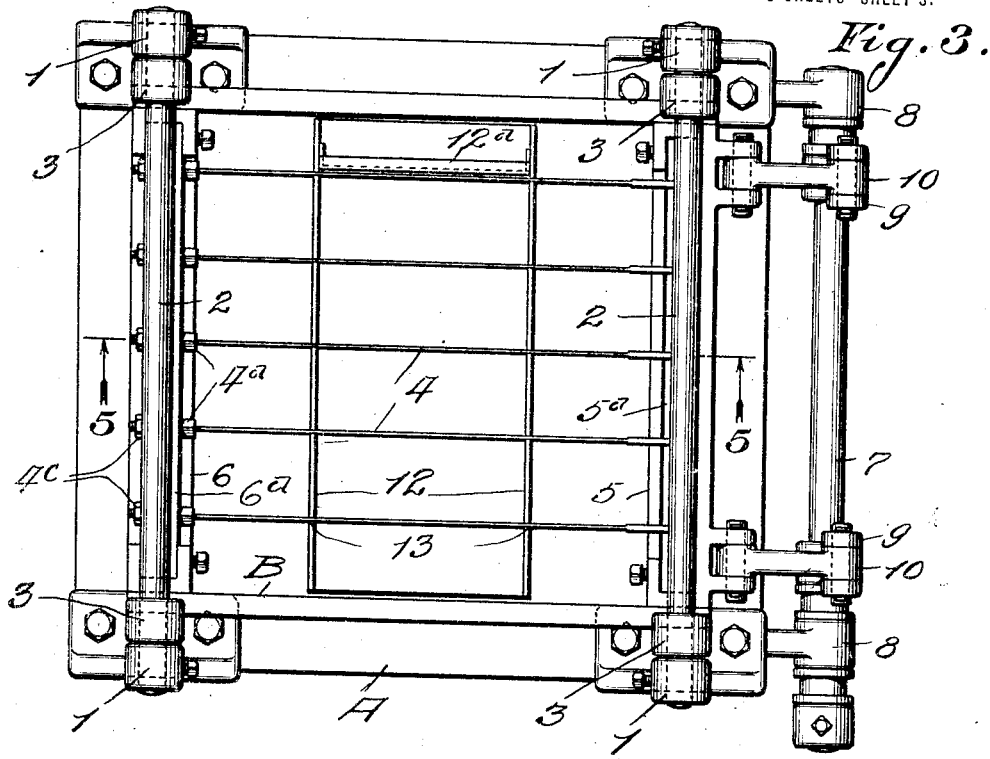
Fig. 3.
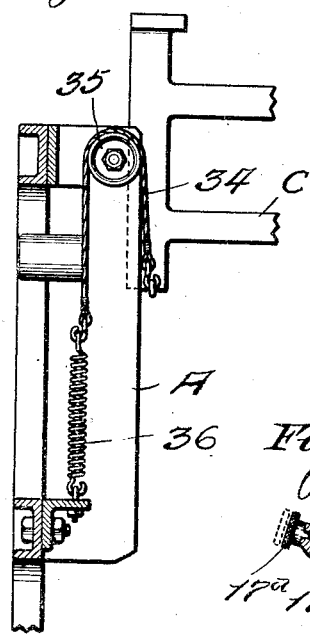
Fig. 4.
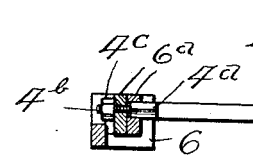
Fig. 5.
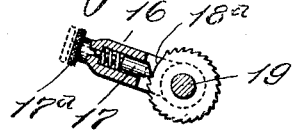
Fig. 6.
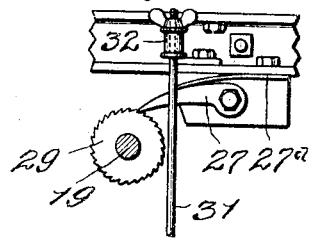
Fig. 7.
Fig. 8.
Inventor:
JAMES T. SHILLITO,
By Bakewell Church
His Attorneys.

UNITED STATES PATENT OFFICE.

JAMES T. SHILLITO, OF ST. LOUIS, MISSOURI, ASSIGNOR TO LOOSE WILES BISCUIT COMPANY, OF KANSAS CITY, MISSOURI, A CORPORATION OF MISSOURI.

CAKE-CUTTING MACHINE.

1,342,875.   Specification of Letters Patent.   Patented June 8, 1920.

Application filed August 12, 1919. Serial No. 317,022.

*To all whom it may concern:*

Be it known that I, JAMES T. SHILLITO, a citizen of the United States, residing at St. Louis, Missouri, have invented a certain new and useful Improvement in Cake-Cutting Machines, of which the following is a full, clear, and exact description, such as will enable others skilled in the art to which it appertains to make and use the same.

This invention relates to cake cutting machines, and has for its main object to provide a machine that will successfully cut fruit cake and similar kinds of cake without gumming up the knives.

Another object is to provide a machine by which a single operator can divide a loaf of cake or other material into small sections or pieces that have sharp square edges.

To this end I have devised a cutting machine that is provided with one or more knives or cutting blades which are so arranged that they will pass transversely through the goods with a draw cut and simultaneously pass downwardly or upwardly through the goods, depending upon whether the knives are arranged above or below the goods. By operating the cutting blades and knives in this manner I eliminate the possibility of the goods sticking to the knives, due to the fact that the knives travel in two directions through the goods, namely, vertically and transversely, and I also obtain perfectly clean, sharp cuts. In fact, my improved machine can be used successfully for cutting a loaf of fruit cake into small pieces or sections without requiring frequent cleaning of the knives or cutting blades, owing to the fact that the blades pass through the cake in such a manner that the fruit in the loaf will not cling to the blades or make the blades gummy. While my improved machine is particularly adapted for cutting fruit cake and other kinds of cake, it is not limited to this use, but, on the contrary, can be used for cutting various other goods or kinds of material that are of a crumbly nature or which contain sticky ingredients that have a tendency to adhere to the blade used to cut same.

Fig. 3 is a top plan view of said machine.

Fig. 4 is a sectional view on the line 4—4 of Fig. 1, illustrating part of the counterbalancing mechanism of the work support.

Fig. 5 is a vertical sectional view, taken on approximately the line 5—5 of Fig. 3, looking in the direction indicated by the arrows, illustrating the way that the cutters are mounted in the cutter holder.

Fig. 6 is a detail view, looking rearwardly from the front of the machine, of the device for preventing retrograde movement of the pinions that move the work support upwardly.

Fig. 7 is a side elevational view of the parts shown in Fig. 6; and

Fig. 8 is a detail view of the pawl and ratchet mechanism that turns the pinions which move the work support upwardly.

Figure 1:
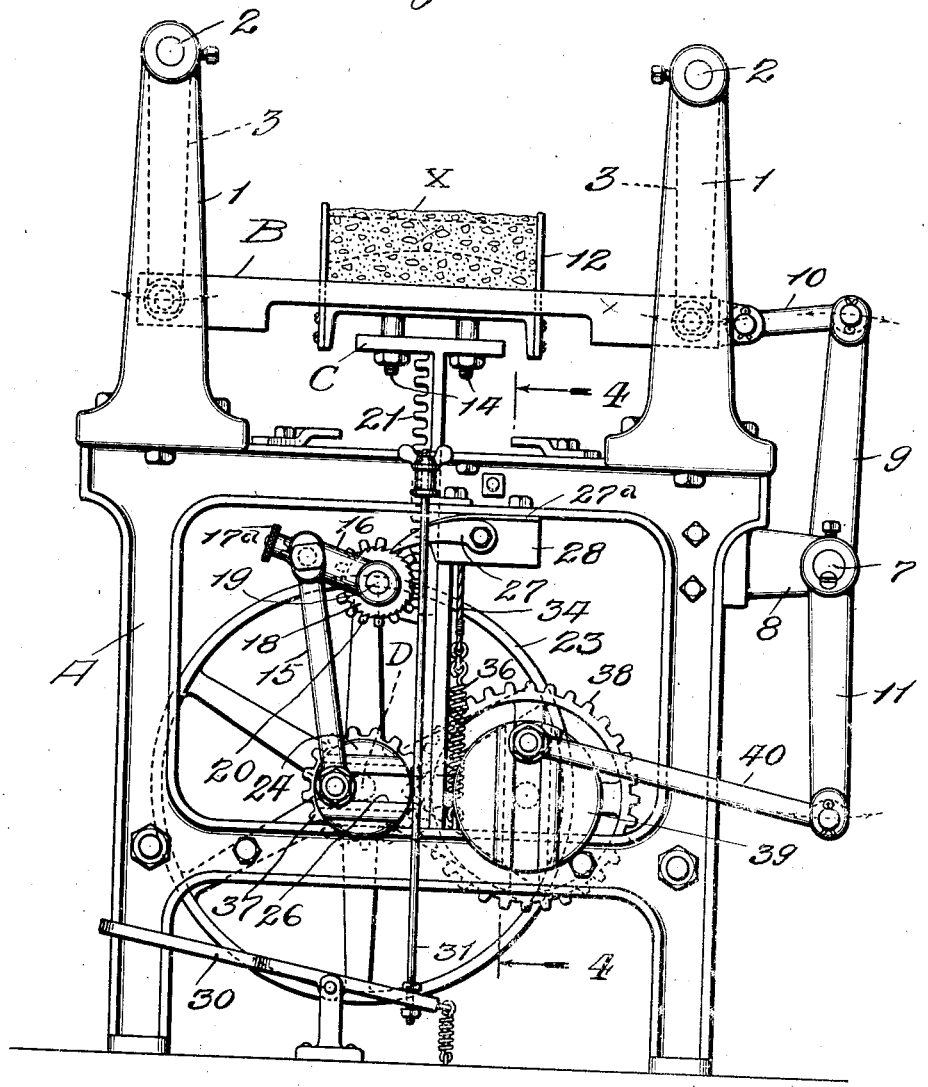
Figure 1 is a side elevational view of a cake cutting machine constructed in accordance with my invention.

I have herein illustrated my invention embodied in a cutting machine provided with a plurality of knives or cutters that move transversely through the work with a draw cut, and means for feeding the work upwardly with relation to said cutters while the cutters are traveling transversely through the work, but I wish it to be understood that my invention is not limited to a machine of the particular construction herein shown.

Referring to the drawings, which illustrate the preferred form of my invention, A designates a frame or supporting structure that is provided with four vertically-disposed standards, arranged in pairs adjacent the front and rear ends of the machine. Each pair of standards 1 support a horizontally-disposed shaft 2 that extends transversely of the machine and each of said shafts has a pair of links 3 oscillatingly mounted thereon. The links 3 carry a rectangular shaped cutter frame B that is joined to the lower ends of the links 3 in such a manner that said cutter frame will always remain in a horizontal position, but will rise and fall as the links 3 oscillate on the shafts 2. The frame B is provided with a plurality of cutters 4 arranged in parallel relation to each other, as shown in Fig. 3, and extending longitudinally of the machine. Each of the cutters 4 consists of a thin, sharp edged blade connected at its rear end in any preferred manner to the cross member 5 of the cutter frame and having its front end connected to the front cross member 6 of the cutter frame in such a manner that said cutter can be stretched longitudinally so as to make it perfectly taut. In the form of my invention herein illustrated the front and rear ends of the cutters 4 are secured to removable cutter holders 5ª and 6ª in the cross pieces 5 and 6, respectively, of the cutter frame, which cutter holders are adapted to be removed and replaced by other cutter holders when it is desired to change the space or distance between the cutters so as to vary the sizes of the pieces into which the loaf is being divided. As shown in Fig. 5, the front ends of the cutters 4 are provided with non-circular shanks 4ª arranged in non-circular shaped sockets in the front cutter holder 6 and provided with screw threaded extensions 4ᵇ on which adjusting nuts 4ᶜ are mounted, thereby enabling the cutters to be stretched perfectly taut by simply turning the adjusting nuts 4ᶜ. The cutter frame B with the cutters 4 rigidly mounted thereon, is swung forwardly and rearwardly by a mechanism comprising a horizontally-disposed rock shaft 7 journaled in bearings 8 at the rear side of the machine and provided with upwardly projecting arms 9 that are pivotally connected by means of links 10 to the rear end of the cutter frame B, said rock shaft 7 being provided with a depending arm 11 that is connected with an operating mechanism, hereinafter described.

Figure 2:
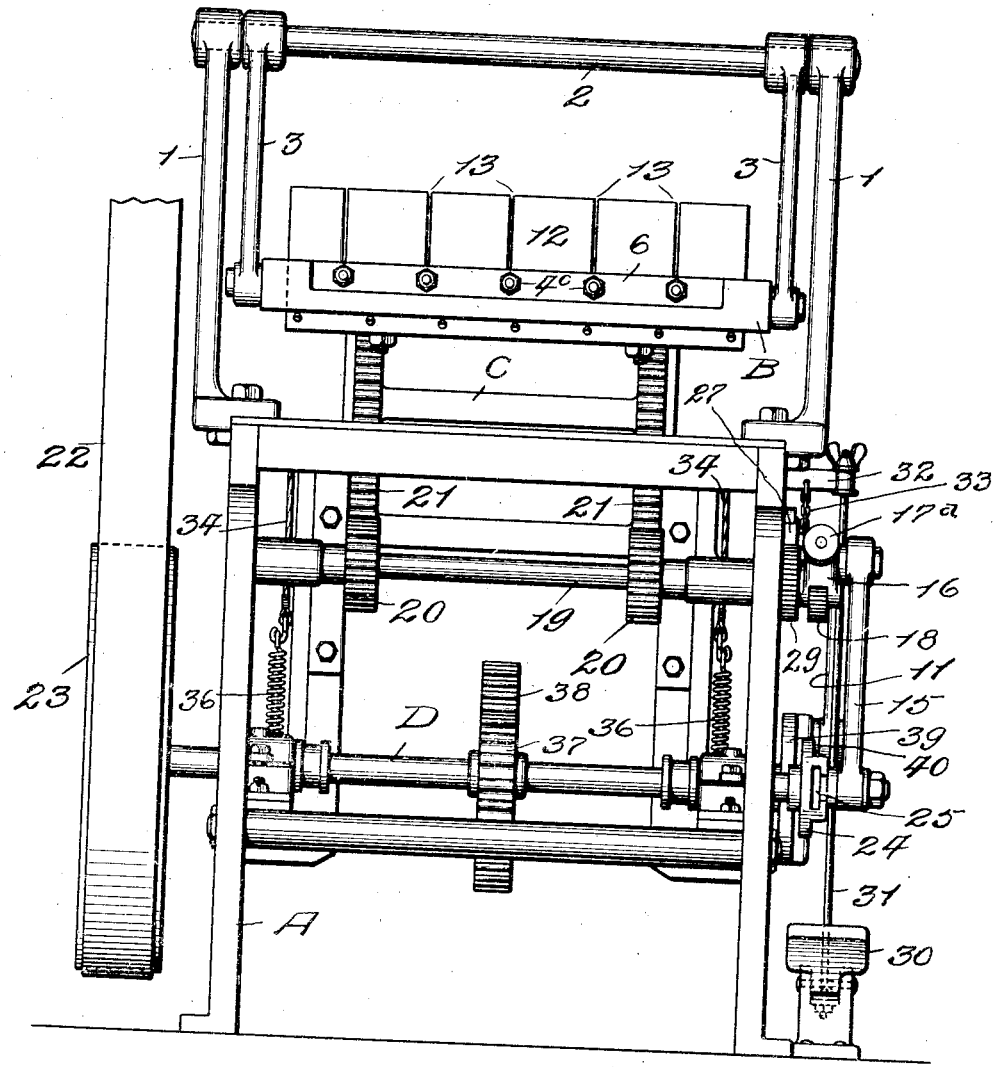
Fig. 2 is a front elevational view of said machine.

The work $x$ which I have herein represented as consisting of a loaf of fruit cake, is carried by a work support C which is so arranged that it will move the work $x$ upwardly while the cutters 4 are moving transversely through the work. Various means may be used for holding the work $x$ in operative position on the work support C, but I prefer to use an open-ended trough 12 of substantially channel shape in cross section arranged transversely of the machine, as shown in Fig. 3, and having its side portions slotted vertically at 13, as illustrated in Fig. 2, so as to form passageways for the cutters 4 when the work support C is moved upwardly to present the work to the cutters and feed the work upwardly relatively to the cutters. The work holder 12 is rigidly connected to the work support C by bolts or other suitable fastening devices 14, and the vertical slots 13 in the side walls of said cutter holder are made deep enough to permit the cutters 4 to pass through the bottom of the loaf $x$ arranged in said work holder. When the work support C is in its depressed position the work holder 12 thereon lies far enough below the cutters 4 to permit a loaf $x$ of cake or other goods to be slipped into the work holder 12 endwise into engagement with a stop or abutment 12ª arranged adjacent one end of the work holder.

Means is provided for moving the work support C upwardly, preferably with a step by step motion, and while various means may be used for this purpose without departing from the spirit of my invention, I prefer to provide the machine with a drive shaft D that actuates a link 15 whose upper end is pivotally connected to a rock arm 16 provided with a spring pressed pawl 17 that coöperates with a ratchet wheel 18 secured to a transversely-disposed horizontal shaft 19 equipped with pinions 20 that mesh with vertically-disposed rack bars 21 which project downwardly from the work support C, the shaft D being driven by any suitable means, such, for example, as a belt 22 that passes over a pulley 23 on said shaft. The lower end of the link 15 is eccentrically connected to the drive shaft so as to cause the rock arm 16 to rock upwardly and downwardly when the drive shaft D is in operation, and thus feed the work support C upwardly intermittently or with a step by step movement. Various means can be used for eccentrically connecting the link 15 to the drive shaft D, but I prefer to secure a disk 24 to the right hand end of the drive shaft D and adjustably connect the lower end of the link 15 to said disk so as to enable the feed of the work support to be varied by changing the point of connection of the link 15 with the disk 24. In the machine herein illustrated the lower end of the link 15 is pivotally connected to a sliding block 25 that is adjustably mounted in a guide way or groove 26 in the disk 24. The ratchet wheel 18 of the work support feeding mechanism is provided with an untoothed portion 18ª, as shown in Fig. 8, so as to cause the shaft 19 to come to rest automatically when the work support C reaches its upper limit of movement. The shaft 19 is prevented from rotating rearwardly, when the arm 16 rocks rearwardly preparatory to feeding said shaft one step forwardly, by means of a locking pawl 27 pivotally connected to a bracket 28 on the frame of the machine arranged so that it normally is in engagement with a ratchet wheel 29 rigidly connected to the shaft 19.

After the work support C reaches the upper end of its stroke the operator in charge of the machine operates a device that disengages the pawl 27 from its coöperating ratchet 29 and at about the same time the operator disengages the pawl 17 from its coöperating ratchet 18, thereby permitting gravity to move the work support C downwardly into its depressed position. The means herein illustrated for disengaging the locking pawl 27 consists of a foot treadle 30 connected by means of a link 31 with a lever 32 that is joined by means of a chain 33 to the locking pawl 27, as shown in Fig. 6, the act of depressing the front end of the foot treadle 30 causing the locking pawl 27 to be disengaged from its coöperating ratchet 29. As soon as the operator removes his foot from the treadle 30 a spring 27ª moves the locking pawl 27 back into engagement with its coöperating ratchet wheel. The pawl 17 in the rock arm 16 is provided with a finger piece 17ª that the operator can grasp so as to move said pawl into such a position that the ratchet wheel 18 on the shaft 19 will rotate with said shaft during the downward movement of the work support C. In order to prevent the work support C from being subjected to a sharp, sudden blow when it reaches the end of its downward stroke, said work support is equipped with a counterbalancing mechanism consisting of cables 34 that pass over pulleys 35 on the frame of the machine and having their opposite ends connected to the work support and to springs 36 that are secured to the frame of the machine, as shown in Fig. 4.

The mechanism for actuating the rock shaft 7, previously referred to, which moves the cutter frame B forwardly and rearwardly, consists of a pinion 37 on the drive shaft D meshing with a gear 38 on a horizontally disposed shaft arranged adjacent the rear end of the machine and provided at one end with a disk 39 to which a link 40 is eccentrically connected in substantially the same manner that the link 15, previously referred to, is connected to the disk 26 on the drive shaft, the outer end of the link 40 being secured to the depending arm 11 on the rock shaft 7. By changing the point of connection of the link 40 with the disk 39 the stroke of the cutter frame B can be accurately regulated.

Assuming that the work support C is in its depressed position, the operator first introduces the loaf $x$ into the work holder 12 on the work support C and then adjusts the pawl 17 in the rock arm 16 so that it will coöperate with the ratchet wheel 18 on the shaft 19. Thereafter, the shaft 19 rotates one step forwardly at each stroke of the rock arm 16, thus causing the work support C to be fed upwardly intermittently and the cutter frame B to swing forwardly and backwardly continually. Consequently, the cutters 4 move transversely of the loaf $x$ first in one direction and then in the opposite direction as the loaf is being moved upwardly by the work support C, the work support feeding mechanism and the operating mechanism of the cutter frame being so timed that the work moves upwardly one step when the cutters pass through same in one direction, then upwardly another step when the cutters pass through same in the opposite direction, etc. When the work support reaches its upper limit of movement it comes to rest automatically, and as soon as the operator in charge of the machine trips the locking pawl and withdraws the feeding pawl of the work supporting feeding mechanism from engagement with its coöperating ratchet, the work support will move downwardly automatically, due to the force of gravity.

Having thus described my invention, what I claim as new and desire to secure by Letters Patent, is:

1. A cutting machine, comprising a cutter, means for causing said cutter to travel transversely through the work with a draw cut, and means for changing the relative position of the cutter and work while the cutter is traveling transversely through the work so as to form a cut in the work throughout the entire height or depth of same.

2. A cutting machine, comprising a cutter, means for causing said cutter to travel back and forth across the work to produce a series of draw cuts in the work, and means for changing the relative position of the cutter and the work in a direction at right angles to the path of the cutter while the cutter is traveling back and forth across the work.

3. A cutting machine, comprising a cutter, means for causing said cutter to travel through the work with a draw cut, and means for moving the work in a direction at right angles to the path of travel of the cutter while the cutter is traveling through the work.

4. A cutting machine, comprising a horizontally disposed reciprocating cutter that rises and falls when it travels through the work, and means for progressively feeding the work toward said cutter while the cutter is traveling through the work.

5. A cutting machine, comprising an oscillating, sharp edged cutter adapted to travel back and forth through the work with a draw cut and form a cut in the work at each stroke of said cutter, and means for changing the relative position of said cutter and work during each stroke of the cutter so as to feed the cutter through the work.

6. A cutting machine, comprising a swinging, sharp edged cutter that travels back and forth through the work and severs the work with a draw cut at each stroke of said cutter, a work support, and means for moving said work support toward said cutter during each stroke of the cutter so as to feed the cutter through the work.

7. A cutting machine, comprising a sharp edged swinging cutter that penetrates into the work with a draw cut on the forward stroke and on the return stroke of said cutter, a work support, means for moving said work support toward said cutter each time said cutter swings in either direction so as to feed the cutter through the work, and means for automatically arresting the movement of said work support after the cutter has passed through the work.

8. A cutting machine, comprising a cutter frame arranged above the work and provided with a sharp edged cutter, means for moving said frame back and forth across the work and causing it to rise and fall so that the cutter will penetrate into the work with a draw cut on the forward stroke and on the return stroke of said frame, and means for moving the work upward toward said cutter while the cutter is traveling transversely through the work, so as to cause the cutter to pass through the work.

9. A cutting machine, comprising a cutter frame arranged above the work and provided with a plurality of sharp edged parallel cutters, oscillating members pivotally connected at their lower ends to said frame, means for reciprocating said frame, a work support, and means for moving said work support at right angles to the path of travel of the cutter frame each time said frame swings in either direction so as to feed the cutter through the work.

10. A cutting machine, comprising a cutter that is adapted to travel back and forth through the work and sever the work with a draw cut on the stroke of said cutter in each direction, a work support, a rack and pinion mechanism for moving said work support toward said cutter, and a pawl and ratchet mechanism for actuating said rack and pinion mechanism so as to cause the work support to move while the cutter is traveling through the work.

11. A cutting machine provided with a work support, a rack depending from said work support, a pinion meshing with said rack for moving said work support upwardly, a rock arm provided with a pawl that coöperates with a ratchet wheel rigidly connected with said pinion, means for operating said rock arm, and a locking pawl for preventing retrograde movement of said pinion.

12. A cutting machine provided with a work support, a rack and pinion for moving said work support in one direction, a rock arm provided with a pawl that coöperates with a ratchet wheel rigidly connected with said pinion, means for operating said rock arm, a locking pawl for preventing retrograde movement of said pinion, and means under control of the operator in charge of the machine for tripping said locking pawl so as to permit the work support to descend by gravity.

13. A cutting machine, comprising a swinging cutter frame, sharp edged cutters in said frame arranged above the work and adapted to sever the work with a draw cut on each forward and return stroke of said frame, a support for the work, means for feeding said work support toward said cutter, an operating mechanism for said cutter frame, and mechanism for changing the stroke of said cutter frame and for varying the feed of said work support.

14. A cutting machine, comprising a frame, uprights on said frame arranged in pairs, links carried by said uprights, a rectangular shaped cutter frame pivotally connected to the lower ends of said links and provided with a plurality of sharp edged cutters arranged in parallel relation to each other, a support for the work, mechanism for reciprocating said cutter frame and means for feeding said work support upwardly during each forward stroke and each return stroke of said frame.

15. A cutting machine, comprising a frame, uprights on said frame arranged in pairs, links carried by said uprights, a rectangular shaped cutter frame pivotally connected to the lower ends of said links and provided with a plurality of sharp edged cutters arranged in parallel relation to each other, a work support provided with a rack, a pinion meshing with said rack, a pawl and ratchet mechanism for actuating said pinion, a drive shaft for operating said pawl and ratchet mechanism and means operated by said drive shaft for swinging the cutter frame transversely of the work.

JAMES T. SHILLITO.